Aug. 7, 1928.　　　　　　　　　　　　　　　　　　1,679,720
E. D. HIGBY
FRUIT DRIER
Filed Sept. 28, 1927　　　　3 Sheets-Sheet 1

INVENTOR.
Earl D. Higby.
BY
Carl P. Griffin
ATTORNEY.

Aug. 7, 1928.
E. D. HIGBY
1,679,720
FRUIT DRIER
Filed Sept. 28, 1927   3 Sheets-Sheet 2
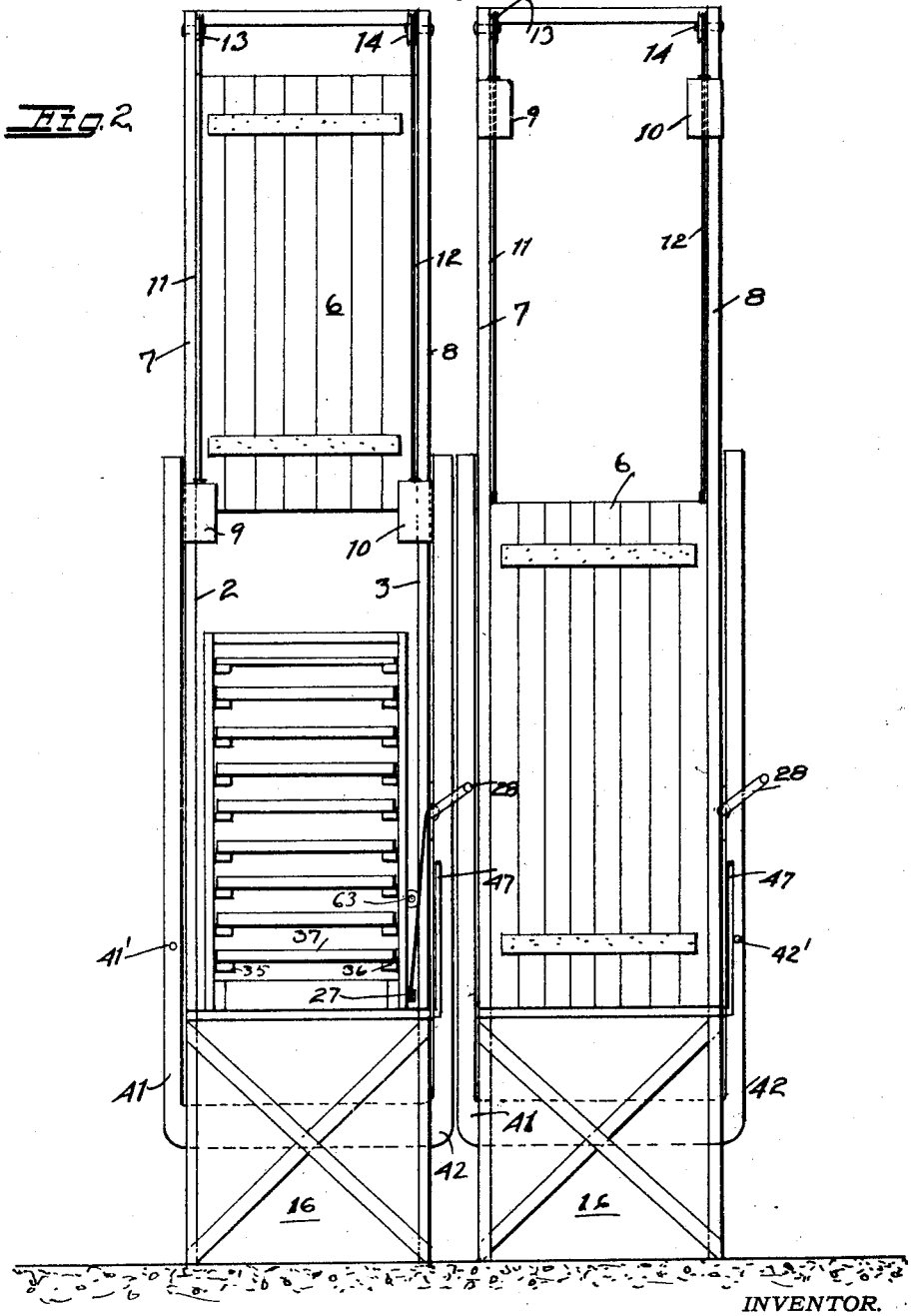
INVENTOR.
Earl D. Higby
BY
Carlos P. Griffin
ATTORNEY.

Aug. 7, 1928.
E. D. HIGBY
1,679,720
FRUIT DRIER
Filed Sept. 28, 1927
3 Sheets-Sheet 3
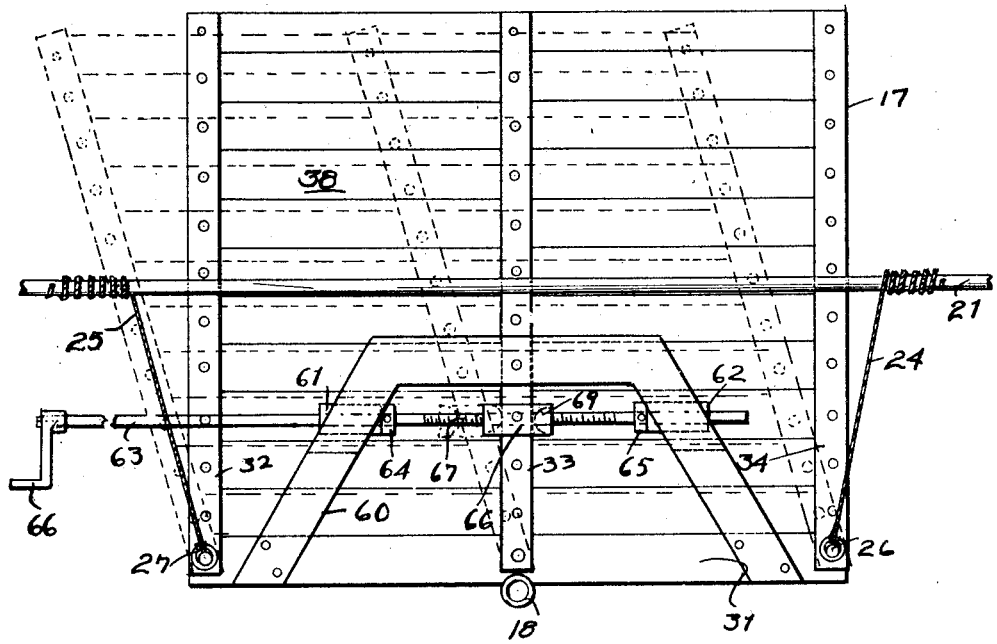
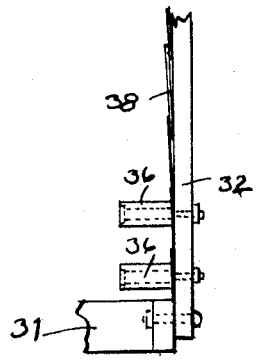
INVENTOR.
Earl D. Higby.
BY Carlos P. Griffin
ATTORNEY.

Patented Aug. 7, 1928.

1,679,720

UNITED STATES PATENT OFFICE.

EARL D. HIGBY, OF SANTA ROSA, CALIFORNIA.

FRUIT DRIER.

Application filed September 28, 1927. Serial No. 222,502.

This invention relates to a drier which is especially intended for fruit drying, but which can be used for drying any desired material.

An object of the invention is to produce a drier capable of handling up to 20 large 3 x 7 foot fruit trays in each cage or compartment which cage is capable of being adjusted in position to increase or diminish the air draft over the fruit on each individual tray to suit any stage of drying.

Another object of the invention is to provide a tilting mechanism for the shifting of the cage from an inclined position to a reversely inclined position, if desired, which cage is in addition shiftable with respect to its supports to change the position of the trays to increase or diminish the end projection thereof so as to properly regulate the passage of hot air over the trays.

Another object of the invention is to produce a drier having a considerable capacity at the minimum cost, the construction being designed to give adequate results without the use of a fan for moderately large installations but which can be easily increased in capacity by the use of a fan.

Another object of the invention is to make possible the easy loading and unloading of the cages even though they may be so high that without the tilting feature of the cages it would be practically impossible for two men to stand on the working platform and place the trays in the cage.

Another object of the invention is to make use of a smokeless oil burner ordinarily, but which can, with the use of smoke flues easily be changed to handle any kind of fuel.

Another object of the invention is to arrange the drier in a series of compartments so it will be possible to use it for bleaching a cage full of trays followed by the drying operation, the drier being built in units capable of being added to at will.

Another object of the invention is to so arrange the burner and flues as to get the maximum efficiency out of the heat expended, only a determined quantity of air, sufficient to take away the moisture being allowed to enter and leave the drier at all times.

Another object of the invention is to provide a convenient mechanical means for shifting the tray cage from one position to another which can be easily operated from the working platform when the doors are raised.

Another object of the invention is to provide means for preventing the heat from causing the hot air to blow up in the faces of the workmen when they are removing and replacing trays in the cage.

Another object of the invention is to provide means whereby the hot air will be confined to movement along the trays, as much as possible, and whereby all the hot air can be caused to pass over only a few trays, if the cage is not full.

Another object of the invention is to provide hand power means for racking the cage.

Other objects of the invention will be apparent as the description proceeds.

An embodiment of the invention is shown in the accompanying drawings in which the same reference numeral is applied to the same portion throughout the several figures of the drawings and of which there may be modifications.

Figure 2 is a front elevation of the drier showing two of the drier units, one open, the other closed, Figure 3 is an enlarged side elevation of the tray cage, and Figure 4 is a detail of the cage.

Figure 1:
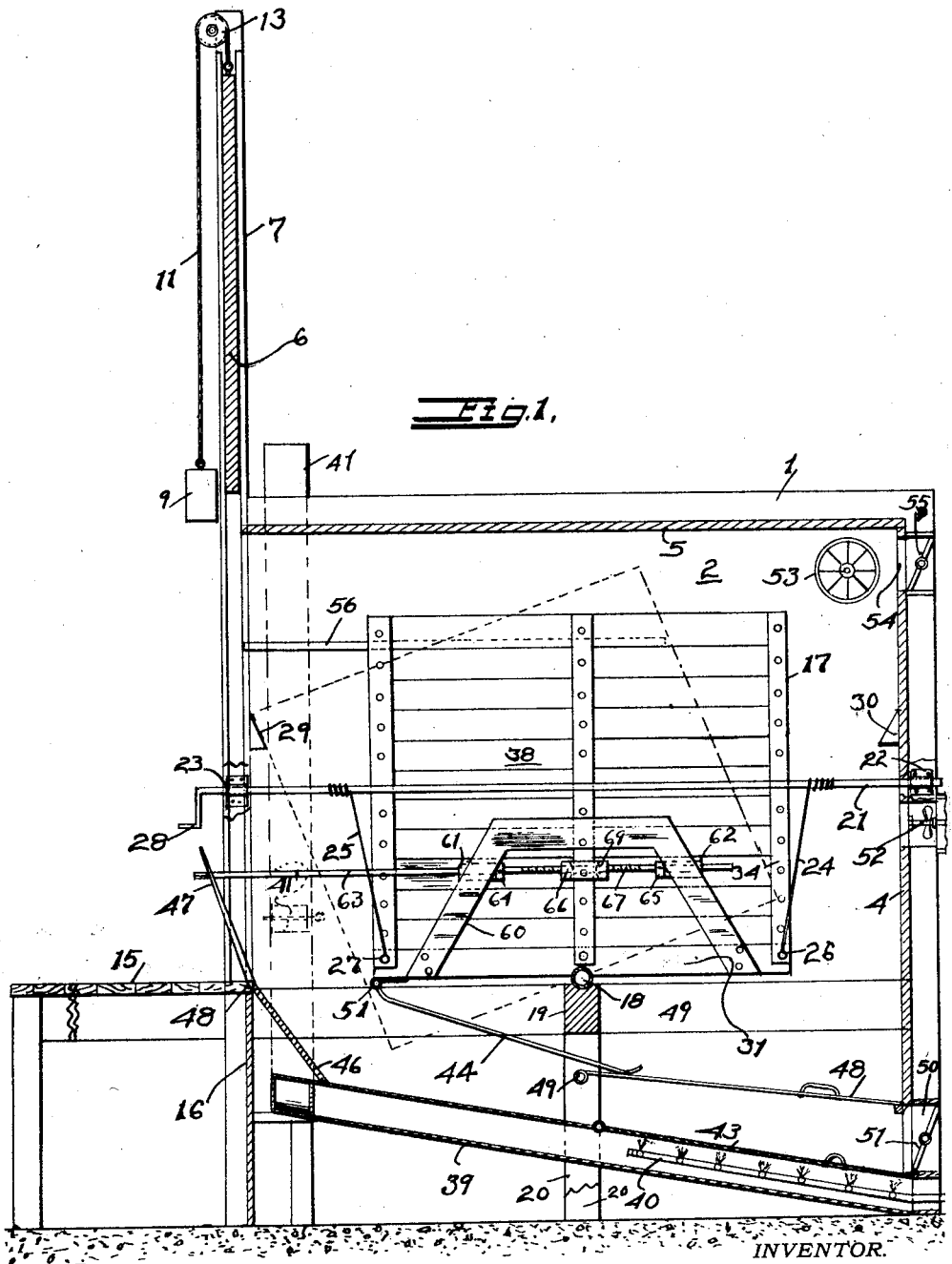
Figure 1 is a side elevation of the drier partly in section.

The numeral 1 indicates a drier housing which has the side walls 2 and 3, the end wall 4, top 5.

The vertical sliding door 6 has guideways on the posts 7 and 8 and is balanced by the weights 9 and 10, ropes 11 and 12 passing over pulleys 13 and 14 on the posts 7 and 8. 15 indicates a platform for the operators of the drier to stand on while loading or unloading the fruit trays. A panel 16 closes the space under the platform.

In the housing the drying cage 17 is mounted on the pivot 18 which consists of a pipe of suitable size supported on the cross beam 19 which has both ends resting on the upright posts 20. The cage is tilted and held in any position by means of the pipe 21 mounted in bearings 22 and 23 on the housing 1, the ropes 24 and 25, one wound one way and the other wound the reverse way on the pipe, the ropes being attached to the cage at 26 and 27. A crank 28 provides means for tilting the cage from the platform.

Suitable bumpers 29 and 30 are provided for the cage to come to rest on, but it is rare that the cage is tilted enough to strike the bumpers.

The cage consists of a rigid bottom frame 31 having three vertical members 32, 33 and 34 pivoted on each side. On the inside of these members are mounted the rollers 35 and 36 for receiving the fruit holding trays 37.

In this type of cage it is practical to provide a cage holding twenty trays, but eight are shown in the drawing.

The sides of the cage are covered by sheet metal plates 38 which overlap each other as shown in Figure 4 and are pivoted on the same bolts as the members 32, 33 and 34. Under the cage is the heating element consisting of the flue 39 having the burners 40 therein. This flue connects to the side pipes 41 and 42. The flue is the same width as the inside of the housing and has the door 43 to afford access to the burners.

To carry hot air to the front of the cage the sheet metal plate 44 is pivoted to the bottom of the cage at 45 and follows the tilting of the cage. To prevent the hot air coming up in the faces of the workmen when loading or unloading the cage the door 46 is provided which can be tilted up by the lever 47 to shut off the hot air. Another door 48 is hinged at 49 to convey fresh air from the opening 50 over the flue to be heated. This opening has the damper 51 to regulate the amount of fresh air admitted. The door is hinged to allow access to the flue door 43.

A blower 52 adapted to be driven by an electric motor not shown is provided and used to draw out the hot moist air when required; and an auxiliary blower 53 is mounted in an opening near the top, either or both of these blowers may be used at one time or the use of the opening 54 may be all that is required to carry off the air. A damper 55 is adapted to close or regulate the size of the opening.

Other blowers and openings controlled by dampers may be provided as found to be desirable.

An air tight slide 56 of the same width as the trays is used to prevent the hot air from passing up over the front of the cage. The slide is applied in the tray space above the highest tray of fruit and pulled forward to the door 6 so that the hot air is directed into the loaded trays. With this arrangement the cage can be loaded to capacity or have only a few trays therein.

In operation the door 6 is raised and the loaded trays placed in the cage and the slide 56 placed in over the highest tray. The door 46 is raised to shut off the hot air when loading. The cage may be racked forward as shown in the dotted lines Figure 3, or racked backward the same way as well as tilted on the pivot 18.

By racking the cage forward each tray projects a little beyond the end of the one below so that each tray catches some of the rising hot air and deflects it over the fruit by racking more or less and tilting the cage the amount of hot air passing over the fruit can be regulated much more effectively than it could without these features.

A coal furnace could be used with this type of heater as well as the gas burner shown as no smoke could get to the fruit from the flue 39.

In placing the top trays the cage is tilted as shown in dotted lines in Figure 1. This makes it possible to load more trays in the cage than if the cage was rigid.

Various means may be used for racking the cage.

The means shown consists of a bracket 60 bolted to the frame 31, bearings 61 and 62 are fixed to the bracket, a rod 63 passes through bearings and is held in place by the collars 64 and 65 which are pinned on to the rod. A removable crank 66 is provided for turning the rod. Screw threads 67 on the rod work in a threaded block 68. This block fits over the vertical member 33 and bears against both sides by means of the rounded members 69. This allows the block to slip on the vertical member when the cage is racked.

Having thus described my invention, what I desire to secure by Letters Patent of the United States is as follows, but modifications may be made in carrying out the invention as shown in the drawings and in the above particular described form thereof, within the purview of the annexed claims.

1. A drier of the class described comprising a housing, a fruit tray carrying cage pivoted in said housing, means to tilt said cage on its pivot, and means to hold said cage in adjusted positions.

2. A drier of the class described comprising a housing, a fruit tray carrying cage mounted on a pivot in said housing, means to tilt said cage on said pivot, means to hold said cage in any adjusted position, a heating means under said cage, and means to direct the hot air over the fruit in said trays.

3. A drier of the class described comprising a housing having a slide door in one end thereof, a cage pivoted in said housing, trays for holding fruit adapted to slide into said cage one over another, means whereby said cage can be racked forward or backward as well as tilted on its pivot, a heating means in said housing, means to direct the hot air from said heating means over the fruit in said trays, means to admit fresh air, and means to carry away the hot moist air.

4. A drier of the class described comprising a housing, a door in said housing the full width of the inside thereof, a cage mounted on a pivot in said housing, a plurality of rollers mounted on the inside of said cage and adapted to receive trays carrying fruit to be dried, a shaft mounted alongside of said cage, a rope attached to each end of said cage, one of said ropes being wound on the shaft one way, and the other rope being wound the other way whereby the turning of the shaft will tilt the cage on its pivot one way or the other, a crank on said shaft, and means to supply said housing with heated air.

5. A drier of the class described comprising a housing, a heating flue in the bottom of said housing, pipes on each side of said housing and connected to said flue, a burner in said flue, a door in said flue, a tiltable cage in said housing above said flue, fruit trays in said cage, and means to deflect the heat from said flue over the fruit in said trays.

6. A drier of the class described comprising a housing, a cage adapted to receive fruit trays mounted in said housing, means to tilt said cage on a pivot, means whereby said cage can be racked forward or backward, a heating means in said housing under said cage, a heat deflecting slide adapted to be inserted in said cage above said fruit trays, and means to shut off the heat deflected into said cage while said cage is being loaded or unloaded.

In testimony whereof I have hereunto set my hand this 19th day of September A. D. 1927.

EARL D. HIGBY.